US011897256B2

(12) United States Patent
Chiba et al.

(10) Patent No.: US 11,897,256 B2
(45) Date of Patent: Feb. 13, 2024

(54) IMAGE FORMING APPARATUS

(71) Applicant: BROTHER KOGYO KABUSHIKI KAISHA, Nagoya (JP)

(72) Inventors: Yuto Chiba, Nagoya (JP); Takashi Suzuki, Toyota (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/154,943

(22) Filed: Jan. 16, 2023

(65) Prior Publication Data

US 2023/0234377 A1 Jul. 27, 2023

(30) Foreign Application Priority Data

Jan. 25, 2022 (JP) ................................ 2022-009141

(51) Int. Cl.

| | |
|---|---|
| ***B41J 11/66*** | (2006.01) |
| ***B41J 29/13*** | (2006.01) |
| ***B41J 11/00*** | (2006.01) |
| ***B65H 7/06*** | (2006.01) |

(52) U.S. Cl.

CPC .............. *B41J 11/006* (2013.01); *B65H 7/06* (2013.01); *B65H 2511/528* (2013.01)

(58) Field of Classification Search

None

See application file for complete search history.

(56) References Cited

U.S. PATENT DOCUMENTS

| | | | | |
|---|---|---|---|---|
| 6,030,135 | A | 2/2000 | Imai | |
| 2002/0006304 | A1 | 1/2002 | Naitou | |
| 2021/0237492 | A1 | 8/2021 | Watari et al. | |
| 2021/0309025 | A1* | 10/2021 | Takahashi | B41J 15/005 |
| 2023/0286296 | A1* | 9/2023 | Yamaguchi | B41J 11/006 347/16 |

FOREIGN PATENT DOCUMENTS

| | | | |
|---|---|---|---|
| JP | H11-1036 | A | 1/1999 |
| JP | 2002-29109 | A | 1/2002 |
| JP | 2015-45756 | A | 3/2015 |
| JP | 2015-85531 | A | 5/2015 |
| JP | 2021-155198 | A | 10/2021 |

* cited by examiner

*Primary Examiner* — Leslie J Evanisko

(74) *Attorney, Agent, or Firm* — KENEALY VAIDYA LLP

(57) ABSTRACT

An image forming apparatus includes an accommodating part configured to accommodate a sheet-like medium wound in a roll shape, an apparatus main body provided with a conveyer and an image forming engine, an electrically driven cutter, a cover configured to take a closed position for forming an exposable portion of a conveying path downstream in the conveying direction of the cutter and an open position to expose the exposable portion of the conveying path to the outside, a detector configured to detect a conveyance jam of the medium at a position downstream in the conveying direction of the exposable portion of the conveying path, a notifier configured to make notification to a user, and a controller configured to cause the notifier to prompt the user to cut off the medium at an arbitrary position in the exposable portion of the conveying path when the detector detects the conveyance jam.

12 Claims, 6 Drawing Sheets

IMAGE FORMING APPARATUS

REFERENCE TO RELATED APPLICATIONS

This application claims priority from Japanese Patent Application No. 2022-009141 filed on Jan. 25, 2022. The entire content of the priority application is incorporated herein by reference.

BACKGROUND ART

Aspects of the present disclosure relate to an image forming apparatus having a cutter configured to cut a sheet-like medium.

There is known a printer including a tray configured to accommodate a roll body, a conveyer configured to convey a sheet-like medium unwound from the roll body, an image forming engine configured to form an image on the sheet-like medium conveyed by the conveyer, and a cutter configured to cut the sheet-like medium conveyed by the conveyer.

DESCRIPTION

In such a printer configured to convey the sheet-like medium unwound from the roll body and form an image on the sheet-like medium, when a sheet jam occurs for example in the vicinity of the image forming engine while conveying the sheet-like medium, the following operation may be executed. In order to remove the jammed sheet-like medium, the sheet-like medium that has caused the jam is automatically cutoff using the cutter, and then a notification is made to prompt the user to remove the cut off sheet-like medium.

However, in a case where the image forming engine and the cutter are relatively apart from each other along a conveying direction of the sheet-like medium, if the sheet-like medium is automatically cut at the position of the cutter even when the sheet jam has occurred in the vicinity of the head, it is necessary to discard the sheet-like medium extending from the sheet jam occurrence point to the cutter.

At least one aspect of the present disclosure is advantageous to provide one or more improved techniques to achieve an image forming apparatus capable of reducing a waste amount of a sheet-like medium even when a sheet jam occurs.

According to aspects of the present disclosure, there is provided an image forming apparatus includes an accommodating part configured to accommodate a roll body in which a sheet-like medium is wound in a roll shape, an apparatus main body provided with a conveyer configured to convey the sheet-like medium unwound from the roll body in a conveying direction and an image forming engine configured to form an image on the sheet-like medium, an electrically driven cutter configured to cut the sheet-like medium conveyed by the conveyer in an intersecting direction intersecting the conveying direction, a cover configured to take a closed position for forming an exposable portion of a conveying path for the sheet-like medium downstream in the conveying direction of the cutter with the apparatus main body and an open position at least partially separated from the apparatus main body to expose the exposable portion of the conveying path to the outside, a detector configured to detect a conveyance jam of the sheet-like medium conveyed to the conveying path by the conveyer at a position downstream in the conveying direction of the exposable portion of the conveying path, a notifier configured to execute a notifying operation for making notification to a user, and a controller configured to cause the notifier to execute the notifying operation including prompting the user to cut off the sheet-like medium which has caused the conveyance jam at an arbitrary position in the exposable portion of the conveying path when the detector detects the conveyance jam of the sheet-like medium.

Hereinafter, a printer 100 according to aspects of the present disclosure will be described with reference to the drawings. In the following description, an up-down direction and a front-rear direction are defined based on the printer 100 which is installed so that it can be used (i.e., the state shown in FIG. 1), and a left-right direction is defined by viewing the printer 100 from the front (i.e., a direction perpendicular to the sheet of FIG. 1 is defined as the left-right direction).

Figure 1:
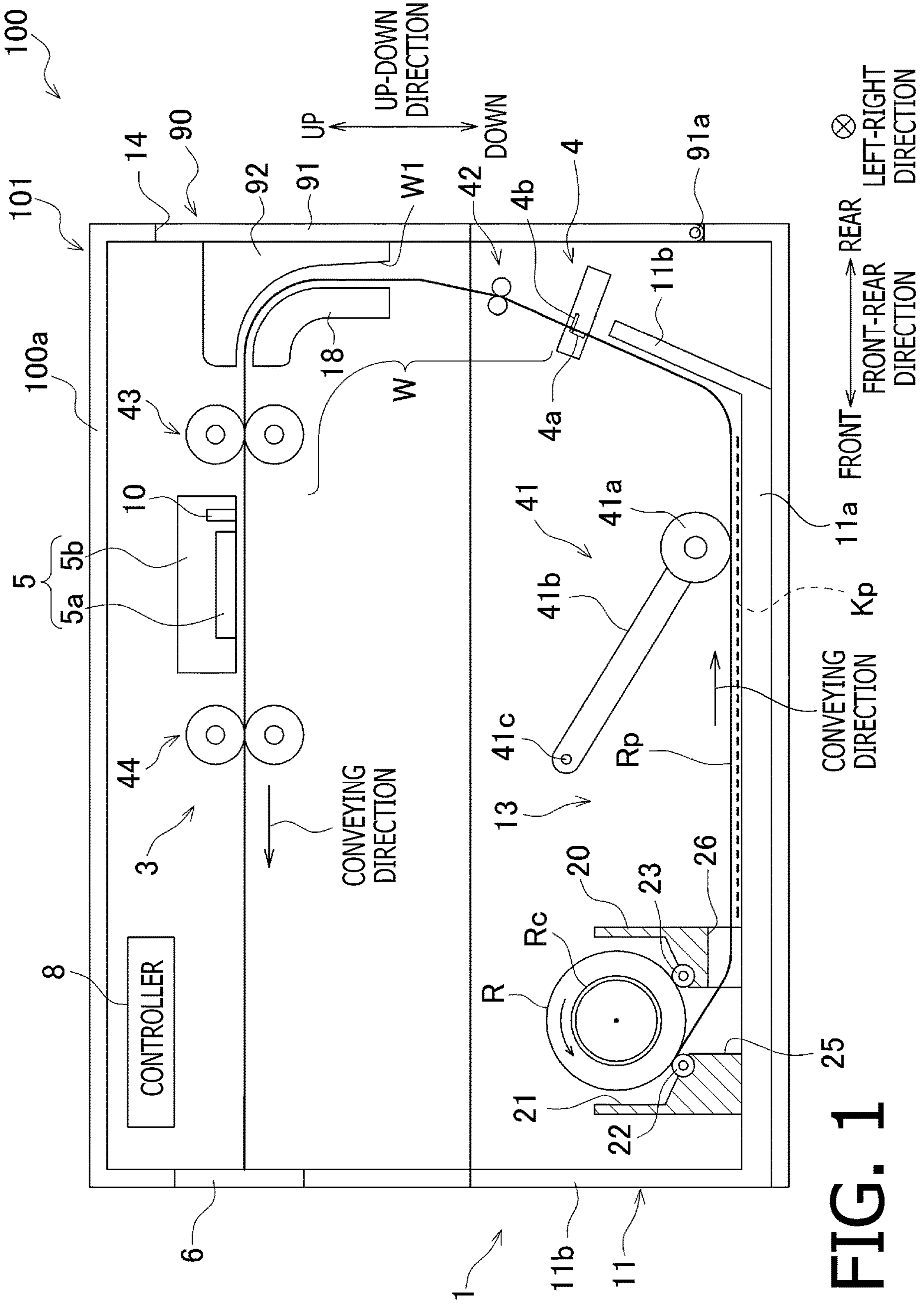
FIG. 1 is a side view showing a schematic configuration of a printer.

As shown in FIG. 1, the printer 100 includes a housing 100*a*, a feeding cassette 1, a conveyer 3, a cutter 4, a head unit 5, a discharge tray 6, a controller 8, a notifier 9 (see FIG. 3), a sheet sensor 10, a cover 90, and the like. In the following description, the housing 100*a* and the feeding cassette 1, the conveyer 3, the head unit 5, the cutter 4, the discharge tray 6, the controller 8, the notifier 9, and the sheet sensor 10 that are accommodated in the housing 100*a* are referred to as an apparatus main body 101. The apparatus main body 101 may not include the feeding cassette 1, the cutter 4, the discharge tray 6, the controller 8, the notifier 9, and the sheet sensor 10, as long as the housing 100*a*, the conveyer 3, and the head unit 5 are included.

The feeding cassette 1 is disposed inside the housing 100*a* below the head unit 5. The feeding cassette 1 selectively accommodate either a roll body R or cut sheets Kp so that either a roll sheet Rp unwound from the roll body R or the cut sheet Kp, can be selectively fed. As shown in FIG. 1, the feeding cassette 1 includes a tray 11, a roll body accommodating part 20 configured to accommodate the roll body R, and a cut sheet accommodating part 13 configured to accommodate a plurality of cut sheet Kp in a stacked state.

As shown in FIG. 1, the roll body R is formed by winding the long roll sheet Rp on an outer peripheral surface of a cylindrical core member Rc in a roll shape. The cut sheet Kp is shorter than the long roll sheet Rp constituting the roll body R and is, for example, A4 size sheet or B5 size sheet. In the following description, when the roll sheet Rp unwound from the roll body R and the cut sheet Kp are not distinguished, they may be referred to as a "sheet P."

As shown in FIG. 1, the tray 11 has a box-like shape including a bottom wall 11*a* and four side walls 11*b* provided at respective edges of the bottom wall 11*a* (only two side walls 11*b* provided at the front and rear edges of the bottom wall 11a are shown in FIG. 1). The tray 11 can be inserted into and removed from the housing 100a in the front-rear direction.

As shown in FIG. 1, the roll body accommodating part 20 is disposed on the front portion of the bottom wall 11a of the tray 11 and rotatably supports the roll body R while supporting an outer peripheral surface of a lower portion of the roll body R. The roll body R is accommodated in the roll body accommodating part 20 with its rotation axis (a center axis of the core member Rc) extending in the left-right direction (in a width direction of the roll sheet Rp).

As shown in FIG. 1, the roll body accommodating part 20 has a recess 21 configured to accommodate the roll body R. Two rollers 22 and 23 are provided at a bottom portion of the recess 21. Each of the two rollers 22 and 23 is rotatable about a rotation axis extending in the left-right direction. When the roll body R is accommodated in the recess 21, the outer peripheral surface of the lower portion of the roll body R is supported by the two rollers 22 and 23.

As shown in FIG. 1, the roll body accommodating part 20 has a hole 25 communicating with the recess 21 and extending in the up-down direction, and a groove 26 communicating with the hole 25 and extending in the front-rear direction. Both the hole 25 and the groove 26 are open on a bottom surface of the roll body accommodating part 20. The hole 25 and the groove 26 are formed to extend long in the left-right direction. More specifically, the hole 25 and the groove 26 are longer than a width of the roll sheet Rp in the left-right direction. The roll sheet Rp unwound from the roll body R is conveyed toward the head unit 5 through the hole 25 and the groove 26.

As shown in FIG. 1, the cut sheet accommodating part 13 is disposed behind the roll body accommodating part 20 (i.e., downstream of the roll body accommodating part 20 in a conveying direction of the sheet P). The cut sheet accommodating part 13 accommodates the cut sheets Kp in a posture in which a longitudinal direction of the cut sheet Kp coincides with the left-right direction and a width direction of the cut sheet Kp coincides with the front-rear direction.

As shown in FIG. 1, the cover 90 is disposed at an opening 14 provided on a back surface of the housing 100a. The cover 90 includes a cover main body 91 and a guide member 92. A lower end portion of the cover main body 91 is rotatably supported by a shaft 91a supported by the housing 100a. The shaft 91a extends in the left-right direction. The cover main body 91 is movable between a closed position (a position shown in FIG. 1) and an open position (a position shown in FIG. 2) by rotating about the shaft 91a.

Figure 2:
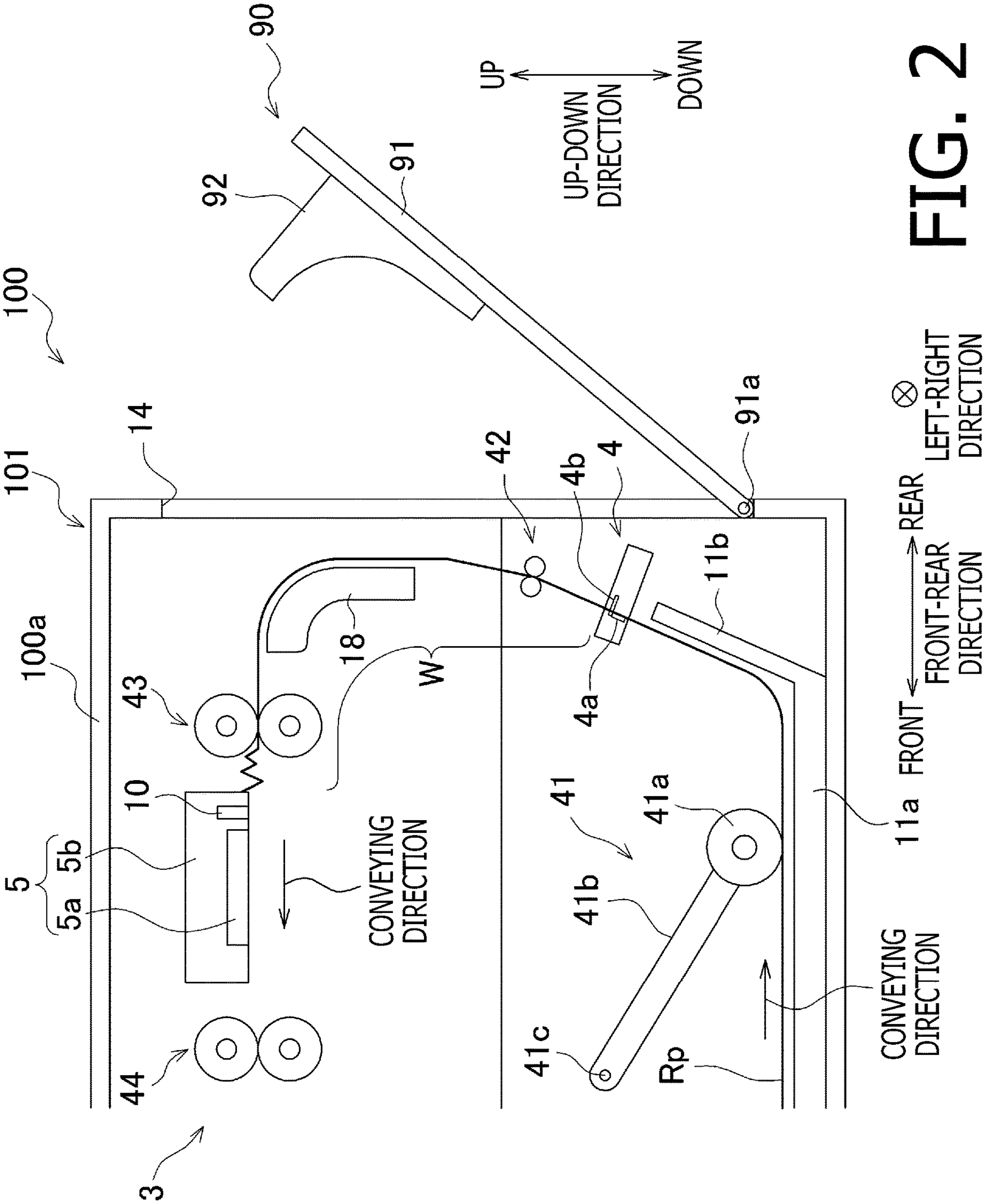
FIG. 2 is a side view of a main section of the printer shown in FIG. 1 when a cover is at an open position.

As shown in FIG. 1, the guide member 92 is disposed outside a guide member 18 provided in the housing 100a and adjacent to a conveying roller pair 43, and a curved path W1 extending upward and then forward is formed between the guide member 18 and the guide member 92. The guide member 92 is fixed to a surface of the cover main body 91 facing the front side at the closed position. Thereby, as shown in FIG. 2, a path W including the curved path W1 can be exposed to the outside by moving the cover main body 91 from the closed position to the open position. The path W mentioned here is a path between the cutter 4 and the head unit 5 among the conveying path (a conveying path from the feeding cassette 1 to the discharge tray 6) through which the sheet P is conveyed by the conveyer 3, and is defined by the guide members 18 and 92 and a not-shown guide member provided inside the housing 100a.

Figure 3:
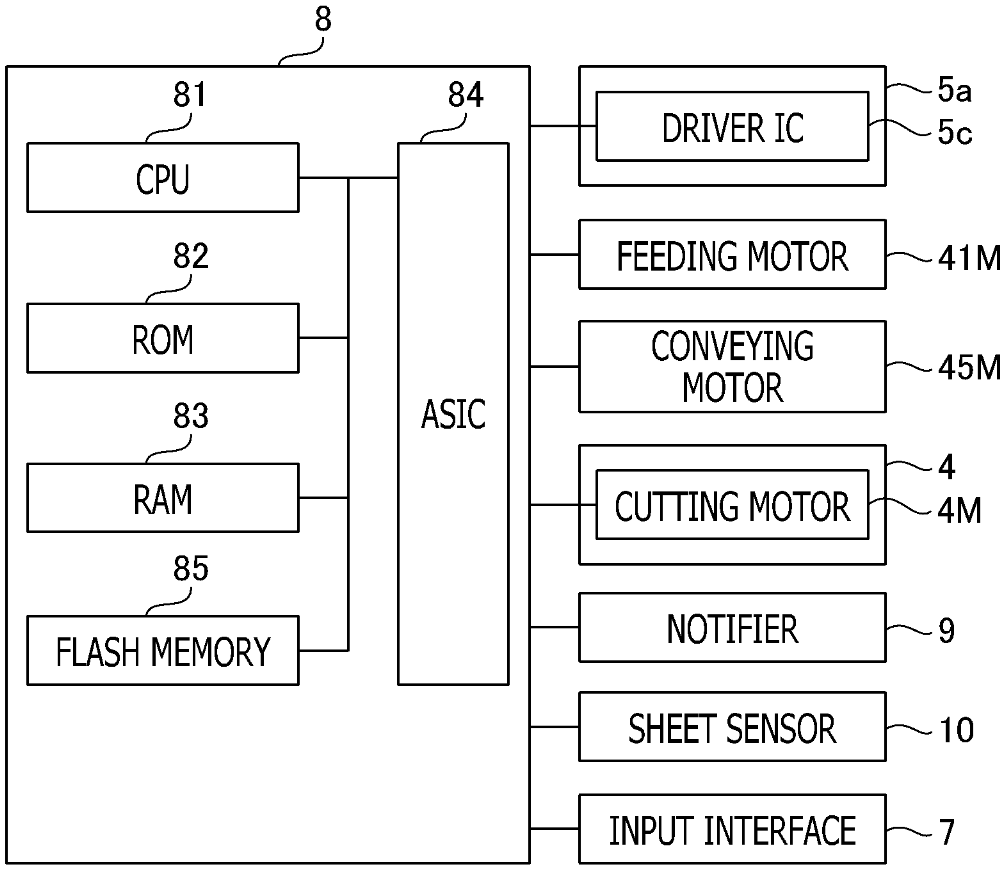
FIG. 3 is a block diagram of a controller of the printer shown in FIG. 1.

The conveyer 3 includes a feeder 41, three conveying roller pairs 42 to 44, and a conveying motor 45M (see FIG. 3). The feeder 41 sends a sheet P, which is either the roll sheet Rp unwound from the roll body R or the cut sheet Kp accommodated in the feeding cassette 1, from the feeding cassette 1 toward the rear side.

The feeder 41 is disposed above the feeding cassette 1, and includes a feeding roller 41a, an arm 41b, and a feeding motor 41M (see FIG. 3). The feeding roller 41a is rotatably supported at a tip end of an arm 41b. The arm 41b is rotatably supported by a support shaft 41c. The arm 41b is biased by a spring or the like in a direction in which the feeding roller 41a comes into contact with the bottom wall 11a of the tray 11. The arm 41b is configured to retract upward when attaching or detaching the feeding cassette 1. The feeding roller 41a rotates by transmission of a driving force from the feeding motor 41M. When the feeding motor 41M is driven by control of the controller 8, the feeding roller 41a rotates, and the sheet P accommodated in the tray 11 is fed backward.

The three conveying roller pairs 42 to 44 convey the sheet P fed by the feeder 41 inside the housing 100a along the conveying direction perpendicular to the left-right direction. The three conveying roller pairs 42 to 44 are arranged in this order from the upstream side in the conveying direction. The conveying roller pair 42 conveys the sheet P fed from the feeding cassette 1 by the feeder 41 along the path W. The conveying roller pair 43 receives the sheet P conveyed by the conveying roller pair 42 and conveys the sheet P to the head unit 5. The conveying roller pair 44 receives and discharges the sheet P conveyed by the conveying roller pair 43. The sheet P conveyed by the conveying roller pairs 43 and 44 is conveyed forward.

Each of the conveying roller pairs 42 to 44 consists of a drive roller configured to rotate by a driving force transmitted from the conveying motor 45M, and a driven roller configured to be driven by the drive roller. When the conveying motor 45M is driven under control of the controller 8, the drive rollers and the driven rollers of the conveying roller pairs 42 to 44 rotate while nipping the sheet P, and the sheet P is conveyed in the conveying direction.

The cutter 4 is disposed in the housing 100a. The cutter 4 is located between a rear end portion of the tray 11 and the conveying roller pair 42. The cutter 4 includes a fixed blade 4a that is elongated in the left-right direction and a disc-shaped rotating blade 4b configured to move in the left-right direction while being in contact with the fixed blade 4a. The rotating blade 4b reciprocates in the left-right direction by the driving of a cutting motor 4M (see FIG. 3) controlled by the controller 8. The rotating blade 4b rotates due to moment acting on the rotating blade 4b due to interactions with the roll sheet Rp and the fixed blade 4a as the rotating blade 4b moves in either the left or right direction. The roll sheet Rp that has been unwound from the roll body R and conveyed is cut in the width direction (the left-right direction) by the cutter 4. A rear end is thereby formed to the roll sheet Rp that is to be conveyed to the discharge tray 6.

The head unit 5 is disposed between the conveying roller pair 43 and the conveying roller pair 44. The head unit 5 includes a head 5a having a nozzle surface on which a plurality of conventionally-known nozzles are formed, and a frame 5b configured to support the head 5a so that the nozzle surface faces downward. The head 5a includes a driver IC 5c (see FIG. 3). When the driver IC 5c is driven under control of the controller 8, the head 5a ejects ink supplied from a conventionally-known ink cartridge from the nozzle to form an image on the sheet P conveyed by the conveying roller pair 43. The sheet P on which the image has been formed is conveyed forward (leftward in FIG. 1) by the conveying roller pair 44. The head 5a may be a line type head configured to eject ink from the nozzles at a fixed position, or a serial type head configured to eject ink from the nozzles while moving in the lateral direction.

The discharge tray 6 constitutes a front side wall of an upper portion of the housing 100*a*, and can be opened and closed with respect to the housing 100*a*. The sheet P on which an image has been formed by the head unit 5 is conveyed forward by the conveyer 3 and received by the discharge tray 6 in an open state. The sheet P is thereby discharged from the printer 100 (i.e., from inside the housing 100*a*).

The sheet sensor 10 includes an optical sensor having a light emitter and a light receiver, but may be any sensor as long as it can detect the sheet P. As shown in FIGS. 1 and 2, the sheet sensor 10 is supported by the frame 5*b* at a position upstream of the head 5*a* in the conveying direction, and is disposed at a position downstream of the path W in the conveying direction. The sheet sensor 10 is disposed so as to be able to detect the sheet P conveyed by the conveying roller pair 43, and outputs a signal indicating that the sheet P has been conveyed to the controller 8 when the sheet P is detected.

For example, if the sheet sensor 10 does not detect the sheet P even after a predetermined period of time has elapsed since the start of conveyance of the sheet P when executing printing, the sheet P is jammed, that is, the conveyance is jammed. In such a case, the controller 8 determines that the conveyance jam has occurred based on fact that the signal has not been received from the sheet sensor 10 even after a predetermined period of time has elapsed since the start of conveyance of the sheet P. As described above, in this embodiment, the sheet sensor 10 and the controller 8 function as a detector configured to detect the conveyance jam.

As a modified example, a sensor capable of detecting that the sheet P conveyed by the conveyer 3 has come into contact with a side wall of the frame 5*b* on the upstream side in the conveying direction may be provided, and the conveyance jam may be directly detected by detecting the contact of the sheet P with the sensor. As described above, the detector according to aspects of the present disclosure may have any configuration as long as the conveyance jam can be detected.

The notifier 9 is configured to execute a notifying operation for notifying the user of various kind of information. The notifier 9 is, for example, a display provided to the printer 100, and executes the notifying operation to the user by displaying information to be notified to the user.

Next, referring to FIG. 3, a controller 8 configured to control the entire printer 100 will be described. The controller 8 includes a Central Processing Unit (CPU) 81, a Read Only Memory (ROM) 82, a Random Access Memory (RAM) 83, an Application Specific Integrated Circuit (ASIC) 84, and a flash memory 85, which are connected to each other by a bus. These components cooperate to control operations of the driver IC 5*c*, the feeding motor 41M, the conveying motor 45M, the cutting motor 4M, the notifier 9, and the like. A signal from the sheet sensor 10 indicating that the sheet P has been conveyed is inputted to the controller 8.

The printer 100 also includes an input interface 7. The input interface 7 includes, for example, buttons provided to the housing 100*a* of the printer 100, a touch panel provided on a display, and the like. The user can input signals to the controller 8 by operating the input interface 7. The input interface 7 can input a signal to instruct setting and cancellation of an automatic cutting mode in which automatic cutting is always executed by the cutter 4 when the conveyance jam occurs. When the automatic cutting mode is active, an automatic cutting flag indicating that the automatic cutting mode is active is stored in the flash memory 85. On the other hand, when the automatic cutting mode is inactive, the automatic cutting flag is not stored in the flash memory 85.

The controller 8 may be one in which only the CPU 81 performs various processes, one in which only the ASIC 84 performs various processes, or one in which the CPU 81 and the ASIC 84 cooperate to perform various processes. The controller 8 may be one in which one CPU 81 performs the processes independently, or one in which a plurality of CPUs 81 share the processes. The controller 8 may be one in which one ASIC 84 performs the processes independently, or one in which a plurality of ASICs 84 share the processes.

Roll Sheet Printing Control

Hereinafter, control by the controller 8 during roll sheet printing to form an image on the roll sheet Rp will be described. In the printer 100, when a roll image forming signal for executing the roll sheet printing is received, the controller 8 executes processes in accordance with a flow shown in FIGS. 4A and 4B. The roll image forming signal is a signal for instructing the printer 100 to form an image on the roll sheet Rp, and is transmitted from an external device or the like to the controller 8.

Figure 4A:
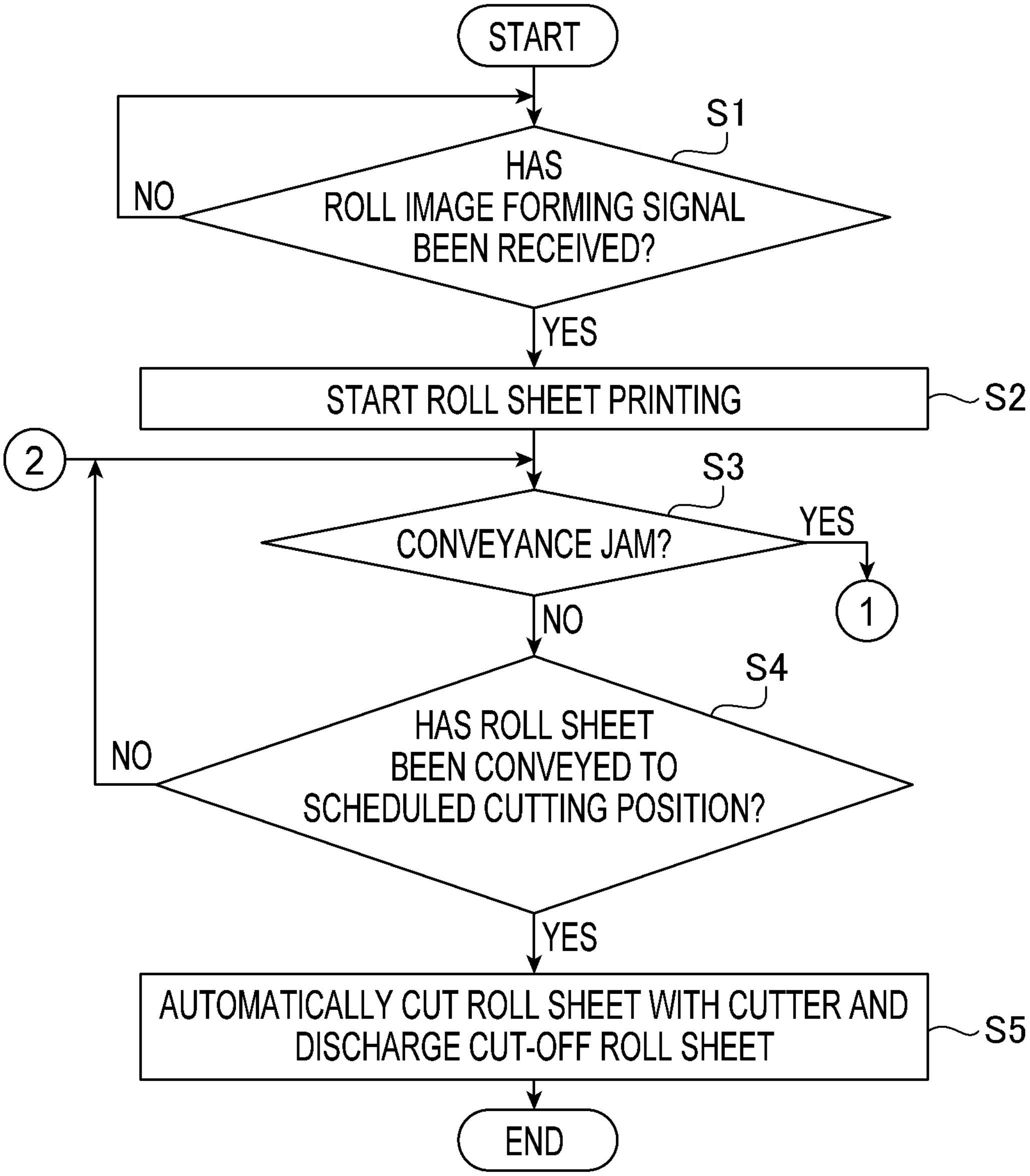
FIG. 4A is a flowchart showing an example of a processing procedure to be executed when the printer shown in FIG. 1 receives a roll image forming signal.
Figure 4B:
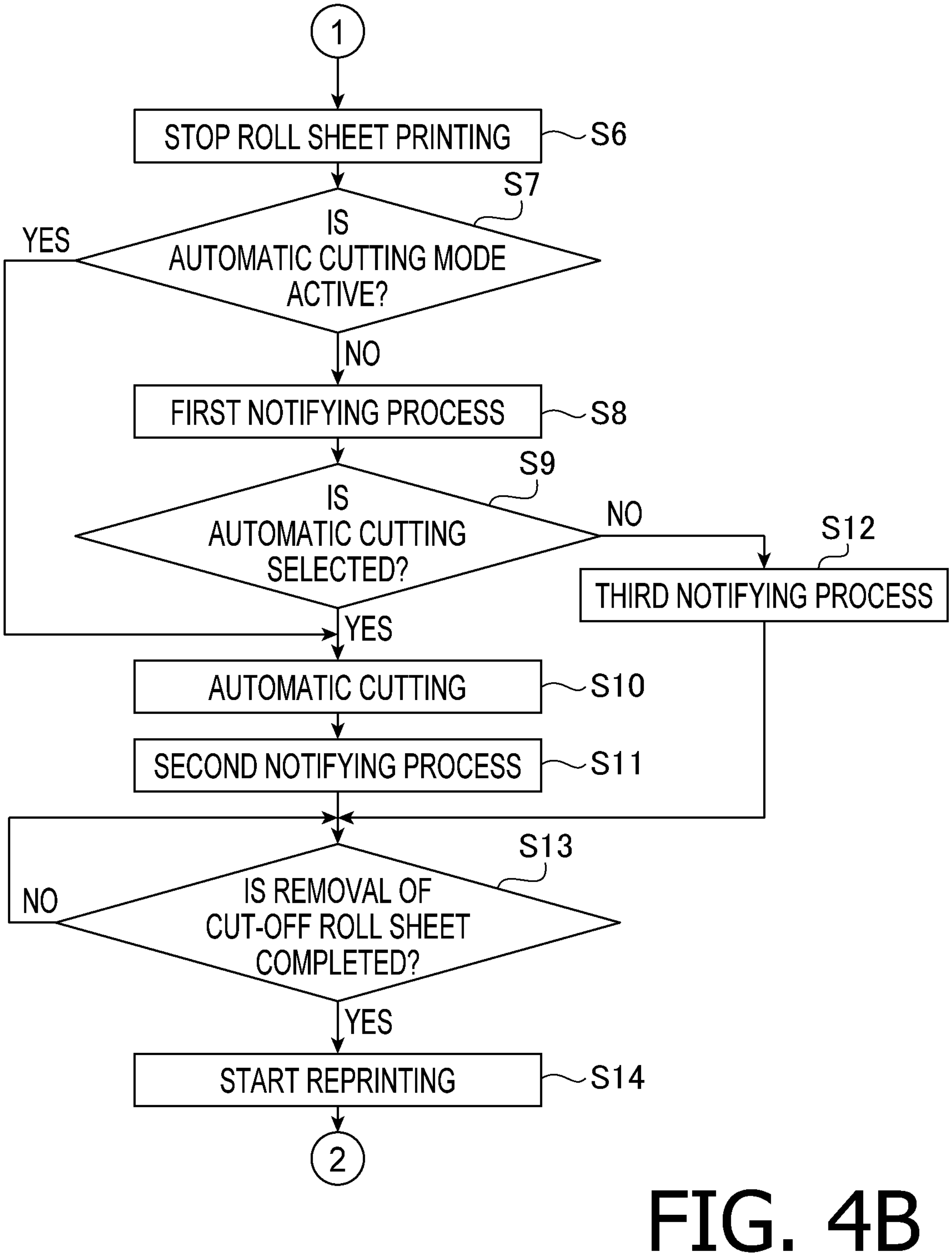
FIG. 4B is a flowchart continued from FIG. 4A.

The flow shown in FIGS. 4A and 4B will be described in detail below. The controller 8 first determines whether the roll image forming signal has been received (51). If the roll image forming signal has not been received (51: NO), the controller 8 repeats 51. If the roll image forming signal has been received (51: YES), the controller 8 starts the roll sheet printing (S2). That is, the controller 8 conveys the roll sheet Rp from the feeding cassette 1 in the conveying direction with the conveyer 3, and forms an image on the roll sheet Rp conveyed by the conveyer 3 with the head 5*a*.

During the roll sheet printing, the controller 8 determines whether the conveyance jam has occurred or not (S3). That is, the controller 8 determines whether the signal indicating the roll sheet Rp conveyed by the conveyer has been received from the sheet sensor 10 within a predetermined time period since the start of the conveyance of the roll sheet Rp. If the controller 8 has received the signal indicating that the roll sheet Rp has been conveyed and determines that the conveyance jam has not occurred (S3: NO), the controller 8 proceeds to S4.

In S4, the controller 8 determines whether the roll sheet Rp has been conveyed to a predetermined cutting position for cutting by the cutter 4 (S4). The controller 8 derives a conveyed amount of the roll sheet Rp based on a signal from a conventionally-known encoder provided to the conveyer 3, and determines whether or not the roll sheet Rp has been conveyed to the predetermined cutting position based on the derived conveyed amount. When the roll sheet Rp has not yet been conveyed to the predetermined cutting position (S4: NO), the controller 8 returns to S3. The predetermined cutting position refers to a position in a conveyance path of the roll sheet Rp where a predetermined rear end position of the roll sheet Rp that makes it possible to form an entire image based on the roll image forming signal on the cut-off sheet when the roll sheet Rp is cut at the predetermined rear end position is located at a position of the cutter 4.

On the other hand, when the roll sheet Rp has been conveyed to the predetermined cutting position (S4: YES), the controller 8 proceeds to S5. In S5, the controller 8 drives the cutting motor 4M to cut the roll sheet Rp with the cutter 4 and discharge the cut-off roll sheet Rp on the discharge tray 6. The image formation on the roll sheet Rp may be performed after cutting the roll sheet Rp within a range up to the rear end of the roll sheet Rp. In this way, the image formation on the roll sheet Rp is completed and the flow ends.

If the controller 8 has not received the signal indicating that the roll sheet Rp has been conveyed and determines that the conveyance jam has occurred (S3: YES), the controller 8 stops the roll sheet printing (S6). Then, the controller 8 determines whether or not the automatic cutting mode is active (S7). That is, the controller 8 determines whether the automatic cutting mode is activated by the user based on whether or not the automatic cutting flag is stored in the flash memory 85.

If the automatic cutting mode is active (S7: YES), the controller 8 proceeds to S10 which will be described later. On the other hand, if the automatic cutting mode is not active (S7: NO), the controller 8 executes a first notifying process (S8). In the first notifying process, the controller 8 causes the notifier 9 to execute, as a notifying operation, an operation to notify contents shown in FIG. 5A, that is, to make the user select whether to automatically cut the roll sheet Rp.

Then, the controller 8 determines whether the user has selected the automatic cutting (S9). When the user selects "YES" in FIG. 5A through the input interface 7 to input an instruction to execute the automatic cutting (S9: YES), the controller 8 drives the cutting motor 4M to cut the roll sheet Rp with the cutter 4 (S10).

Then, the controller 8 executes a second notifying process (S11). In the second notifying process, the controller 8 causes the notifier 9 to execute, as a notifying operation, an operation to notify contents shown in FIG. 5B, that is, an operation to prompt removal of the cut-off roll sheet Rp.

A procedure by the user for removing the cut-off roll sheet Rp will be described. First, the user moves the cover 90 from the closed position to the open position as shown in FIG. 2. The path W is thereby exposed to the outside. Then, the user removes the cut-off roll sheet Rp (i.e., a portion of the roll sheet that caused the conveyance jam) from the path W. Then, the user moves the cover 90 from the open position to the closed position.

Figure 5A:
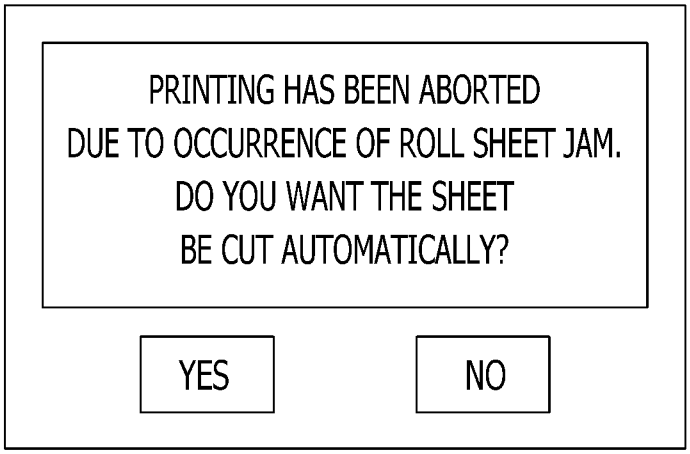
FIG. 5A is a diagram showing contents displayed in a first notifying process.
Figure 5B:
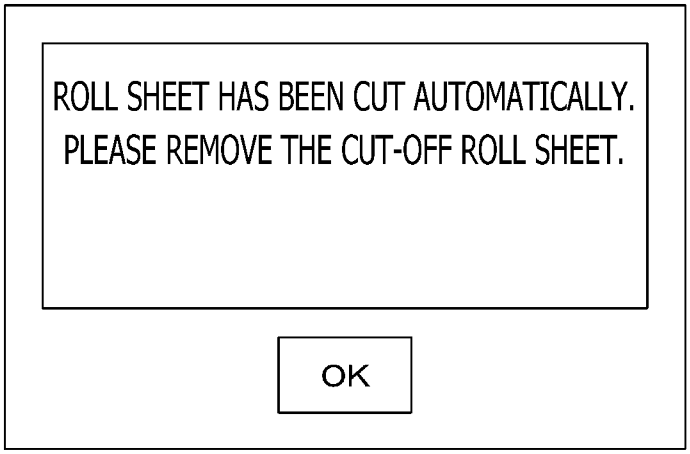
FIG. 5B is a diagram showing contents displayed in a second notifying process.
Figure 5C:
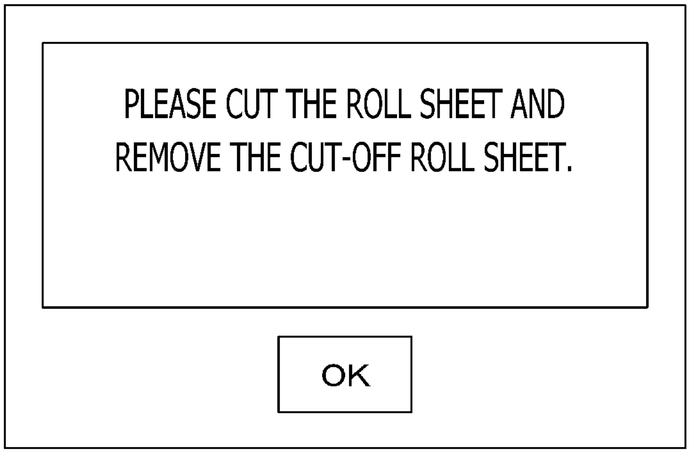
FIG. 5C is a diagram showing contents displayed in a third notifying process.

On the other hand, in S9, when the user selects "NO" in FIG. 5A through the input interface 7 to input an instruction not to execute the automatic cutting (S9: NO), the controller 8 executes a third notifying process (S12). In the third notifying process, the controller 8 causes the notifier 9 to execute, as a notifying operation, an operation to notify contents shown in FIG. 5C, that is, an operation to prompt cutting of the roll sheet Rp and removal of the cut-off roll sheet Rp. The cutting of the roll sheet Rp in the third notifying process means cutting of the roll sheet Rp by the user himself.

A procedure by the user for cutting the roll sheet Rp will be described. First, the user moves the cover 90 from the closed position to the open position as shown in FIG. 2. The path W is thereby exposed to the outside. Then, the user cuts the jammed roll sheet Rp at an arbitrary position in the path W. The arbitrary position means a position where a leading end portion of the jammed roll sheet Rp can be removed, and, in this embodiment, the leading end portion means a portion of the roll sheet Rp shown in FIG. 2 between the guide member 18 and the conveying roller pair 43. The cutting of the leading end portion of the roll sheet Rp may be performed by pulling the jammed roll sheet Rp out from the path W and then cutting the pulled out roll sheet Rp using a cutting tool such as scissors, or may be cut using a cutting tool without pulling the jammed roll sheet Rp out from the path W. In short, the user may cut the roll sheet Rp which has caused the conveyance jam at an arbitrary position in the path W. When the roll sheet Rp is pulled out from the path W and cut, a leading end of the roll sheet Rp after being cut (i.e., a portion that is still connected to the roll body R) is placed back to the path W. When the roll sheet Rp is cut without being pulled out from the path W, the cut-off roll sheet Rp (i.e., a portion that was a leading end of the roll sheet Rp before the cutting but has been separated from the roll body R) is removed from the path W. Then, the cover 90 is moved from the open position to the closed position.

Then, the controller 8 determines whether the removal of the cut-off roll sheet Rp is completed (S13). If the user has not yet selected "OK" in FIG. 5B or 5C through the input interface 7, that is, the user has not yet input an instruction indicating that the removal of the cut-off roll sheet Rp is completed (S13: NO), the controller 8 repeats S13 and waits until the removal of the cut-off roll sheet Rp is completed. On the other hand, when the user has selected "OK" in FIG. 5B or 5C through the input interface 7, that is, when the user has input an instruction indicating that the removal of the cut-off roll sheet Rp is completed (S13: YES), the controller 8 proceeds to S14.

In step S14, the controller 8 starts reprinting. That is, the controller 8 conveys the roll sheet Rp in the conveying direction with the conveyer 3 and forms an image on the roll sheet Rp conveyed by the conveyer 3 with the head 5*a*. Then, the controller 8 proceeds to step S3. Then, the steps S3 to S5 described above are executed and the flow ends.

As described above, in the printer 100 according to aspects of the present disclosure, when the conveyance jam occurs in the conveying path (S3: YES), the user can move the cover 90 from the closed position to the open position to cut the roll sheet Rp at an arbitrary position in the exposed path W based on the third notifying process in S12 after executing S6 to S9. Therefore, the roll sheet Rp can be cut at a position downstream of the cutting position in the conveying direction where the roll sheet Rp is cut with the cutter 4. As a result, even if the conveyance jam occurs, the waste amount of the roll sheet Rp can be reduced.

When the conveyance jam occurs in the conveying path (S3: YES), the user can select whether or not to execute the automatic cutting in S9 after executing S6 to S8.

The automatic cutting mode can be activated by inputting, through the input interface 7, a signal instructing the activation of the automatic cutting mode in which automatic cutting is always executed. This eliminates the need for the user to select automatic cutting every time the conveyance jam occurs. As a result, it is possible to save the user's labor for the cutting.

The cover 90 has a guide member 92 disposed adjacent to the conveying roller pair 43. Therefore, by moving the cover 90 from the closed position to the open position, the user can cut the roll sheet Rp which is causing the conveyance jam in the vicinity of the conveying roller pair 43. Therefore, it is possible to effectively reduce the waste amount of the roll sheet Rp.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the above-described embodiment, the notifying operation for prompting the user to cut the rolls sheet Rp is executed in S12 after executing S6 to S9, but S12 may be executed immediately after the occurrence of the conveyance jam in the path W (S3: YES) or after S6. That is, S7 to S11 may be omitted. Alternatively, one of S7 and S9 may be omitted. When omitting S9, S8 is also omitted. Furthermore, the automatic cutting mode may not be included in the printer 100.

The sheet sensor 10 may be disposed in the path W described above. As long as the sheet sensor 10 is disposed between the curved path W1 and the head unit 5, it is possible to detect the conveyance jam occurring in the curved path W1 and the path between the curved path W1 and the cutter 4, and it is possible to cut the roll sheet Rp within this path (i.e., the exposable portion). Therefore, the same effect as that of the above-described embodiment can be obtained.

In the above-described embodiment, the sheet sensor 10, the cover 90, and the cutter 4 are arranged upstream of the head unit 5 in the conveying direction. However, the sheet sensor, the cover, and the cutter may be arranged in order from downstream to upstream in the conveying direction between the head unit 5 and the discharge tray 6 along the conveying path. Even in this case, it is possible to detect the conveyance jam occurring in the conveying path between the discharge tray 6 and the head unit 5, and it is possible to cut the roll sheet Rp downstream of the cutter in the conveying direction and within this path (i.e., the exposable portion). Therefore, the same effect as that of the above-described embodiment can be obtained.

The cover 90 may not have the guide member 92 as long as the path W can be exposed to the outside by opening the cover main body 91. In the above-described embodiment, the cutter 4 has the fixed blade 4*a*, but instead of the fixed blade 4*a*, a rotating blade that can move in the left-right direction together with the rotating blade 4*b* may be provided. The rotating blade may be replaced with a non-rotating blade.

Aspects of the present disclosure can be applied not only to an ink jet printer but also to an electrophotographic printer including a laser type image forming engine in which an electrostatic latent image is formed by exposing a photosensitive member with a laser and an LED type image forming engine in which an electrostatic latent image is formed by exposing a photosensitive member with an LED. The sheet-like medium may be paper, cloth or the like that is sheet-like.

The head unit 5 is an example of an image forming engine according to aspects of the present disclosure. The roll body accommodating part 20 is an example of an accommodating part according to aspects of the present disclosure. The sheet sensor 10 is an example of a detector according to aspects of the present disclosure. The roll sheet Rp is an example of a sheet-like medium according to aspects of the present disclosure. The left-right direction is an example of an intersecting direction according to aspects of the present disclosure. The path W is an example of an exposable portion of a conveying path according to aspects of the present disclosure. The curved path W1 is an example of a portion of a conveying path according to aspects of the present disclosure.

What is claimed is:

1. An image forming apparatus comprising:

an accommodating part configured to accommodate a roll body in which a sheet-like medium is wound in a roll shape;

an apparatus main body provided with a conveyer configured to convey the sheet-like medium unwound from the roll body in a conveying direction and an image forming engine configured to form an image on the sheet-like medium;

an electrically driven cutter configured to cut the sheet-like medium conveyed by the conveyer in an intersecting direction intersecting the conveying direction;

a cover configured to take a closed position for forming an exposable portion of a conveying path for the sheet-like medium downstream in the conveying direction from the cutter with the apparatus main body, and an open position at least partially separated from the apparatus main body to expose the exposable portion of the conveying path to the outside;

a detector configured to detect a conveyance jam of the sheet-like medium conveyed to the conveying path by the conveyer at a position downstream in the conveying direction from the exposable portion of the conveying path;

a notifier configured to execute a notifying operation for making notification to a user; and a controller configured to cause the notifier to execute the notifying operation including prompting the user to cut off the sheet-like medium which has caused the conveyance jam at an arbitrary position in the exposable portion of the conveying path when the detector detects the conveyance jam of the sheet-like medium.

2. The image forming apparatus according to claim 1, further comprising an input interface configured to allow the user to input a predetermined instruction, wherein the controller:

causes the notifier to execute the notifying operation for allowing the user to select whether to execute an automatic cut of cutting the sheet-like medium which has caused the conveyance jam with the cutter before prompting the user to cut the sheet-like medium when the detector detects the conveyance jam of the sheet-like medium;

causes the cutter to cut the sheet-like medium when an instruction to execute the automatic cut is inputted to the input interface; and causes the notifier to execute the notifying operation for prompting the user to cut the sheet-like medium when an instruction not to execute the automatic cut is inputted to the input interface.

3. The image forming apparatus according to claim 2, wherein, after causing the cutter to cut the sheet-like medium, the controller causes the notifier to execute the notifying operation for prompting the user to remove the cut-off sheet-like medium.

4. The image forming apparatus according to claim 2, wherein when an instruction indicating that the automatic cut is to be always executed when the conveyance jam occurs is input to the input interface, the controller executes the automatic cut when the detector detects the conveyance jam of the sheet-like medium.

5. The image forming apparatus according to claim 1, wherein:

the conveyer includes a conveying roller pair configured to convey the sheet-like medium to the image forming engine, and the cover includes a guide member disposed adjacent to the conveying roller pair and forming part of the exposable portion of the conveying path that guides the sheet-like medium to the conveying roller pair.

6. The image forming apparatus according to claim 1, wherein the cutter and the exposable portion are disposed upstream from the image forming engine.

7. The image forming apparatus according to claim 1, wherein the cutter and the exposable portion are disposed downstream from the image forming engine.

8. The image forming apparatus according to claim 1, wherein the detector is an optical sensor.

9. The image forming apparatus according to claim 1, wherein the detector is a contact sensor.

10. The image forming apparatus according to claim 1, wherein the notifier is a display, and in the notifying operation, the controller causes the display to display information to be notified to the user.

11. An image forming apparatus comprising:

an accommodating part configured to accommodate a roll body in which a sheet-like medium is wound in a roll shape;

an apparatus main body provided with a conveyer configured to convey the sheet-like medium unwound from the roll body in a conveying direction and an image forming engine configured to form an image on the sheet-like medium;

an electrically driven cutter configured to cut the sheet-like medium conveyed by the conveyer in an intersecting direction intersecting the conveying direction;

a cover configured to take a closed position for forming an exposable portion of a conveying path for the sheet-like medium downstream in the conveying direction from the cutter with the apparatus main body, and an open position at least partially separated from the apparatus main body to expose the exposable portion of the conveying path to the outside;

a detector configured to detect a conveyance jam of the sheet-like medium conveyed to the conveying path by the conveyer at a position within the exposable portion of the conveying path;

a notifier configured to execute a notifying operation for making notification to a user; and a controller configured to cause the notifier to execute the notifying operation including prompting the user to cut off the sheet-like medium which has caused the conveyance jam at an arbitrary position in the exposable portion of the conveying path when the detector detects the conveyance jam of the sheet-like medium.

12. The image forming apparatus according to claim 11, wherein:

the conveyer includes a conveying roller pair configured to convey the sheet-like medium to the image forming engine, the cover includes a guide member disposed adjacent to the conveying roller pair and forming part of the exposable portion of the conveying path that guides the sheet-like medium to the conveying roller pair, and the detector is disposed between the conveying roller pair and the guide member.

* * * * *